United States Patent
Turgis et al.

(10) Patent No.: US 12,371,573 B2
(45) Date of Patent: Jul. 29, 2025

(54) THERMOSET UNDERCOATING COMPOSITIONS COMPATIBLE WITH FREE-RADICALLY CURED OVERCOATING FOR METAL SUBSTRATES

(71) Applicant: SWIMC LLC, Cleveland, OH (US)

(72) Inventors: Jean-Dominique Turgis, Vertou (FR); Marie Edith Quereau, Orvault (FR)

(73) Assignee: SWIMC LLC, Cleveland, OH (US)

( * ) Notice: Subject to any disclaimer, the term of this patent is extended or adjusted under 35 U.S.C. 154(b) by 196 days.

(21) Appl. No.: 17/998,850

(22) PCT Filed: May 14, 2021

(86) PCT No.: PCT/US2021/032585
§ 371 (c)(1),
(2) Date: Nov. 15, 2022

(87) PCT Pub. No.: WO2021/231949
PCT Pub. Date: Nov. 18, 2021

(65) Prior Publication Data
US 2023/0193048 A1 Jun. 22, 2023

Related U.S. Application Data

(60) Provisional application No. 63/025,364, filed on May 15, 2020.

(51) Int. Cl.
| | |
|---|---|
| C09D 5/08 | (2006.01) |
| B65D 25/14 | (2006.01) |
| B65D 25/34 | (2006.01) |
| C09D 7/61 | (2018.01) |
| C09D 7/65 | (2018.01) |
| C09D 167/00 | (2006.01) |

(52) U.S. Cl.
CPC .............. C09D 5/08 (2013.01); B65D 25/14 (2013.01); B65D 25/34 (2013.01); C09D 7/61 (2018.01); C09D 7/65 (2018.01); C09D 167/00 (2013.01)

(58) Field of Classification Search
CPC ... C09D 5/08; C09D 7/61; C09D 7/65; C09D 167/00; C09D 5/00; C09D 163/00; B65D 25/14; B65D 25/34; B65D 23/02; B65D 7/42; C08L 61/28; C08L 61/32; C08L 61/20
See application file for complete search history.

(56) References Cited

U.S. PATENT DOCUMENTS

| | | | |
|---|---|---|---|
| 4,230,550 | A | 10/1980 | Vincent |
| 4,266,053 | A | 5/1981 | Imanaka et al. |
| 4,615,915 | A | 10/1986 | Takeda et al. |
| 5,296,571 | A | 3/1994 | Hori et al. |
| 8,574,672 | B2 | 11/2013 | Doreau et al. |
| 9,096,772 | B2 | 8/2015 | Lespinasse et al. |
| 2009/0162592 | A1 | 6/2009 | Baikerikar et al. |
| 2017/0002229 | A1 | 1/2017 | McVay et al. |
| 2018/0112101 | A1 | 4/2018 | Evans et al. |

FOREIGN PATENT DOCUMENTS

| | | |
|---|---|---|
| JP | S61 232151 A | 10/1986 |
| JP | H02 163172 A | 6/1990 |
| JP | H06179851 A | 6/1994 |
| JP | H08 27563 A | 1/1996 |
| JP | 2001031889 A | 2/2001 |
| JP | 2011506755 A | 3/2011 |
| WO | WO 02/43881 A1 | 6/2002 |
| WO | 2014090647 A2 | 6/2014 |
| WO | 2018119175 A1 | 6/2018 |

OTHER PUBLICATIONS

Extended EP Search Report for EP 21804100.2 issued by the European Patent Office on Jul. 31, 2024; 10 pgs.
International Search Report and Written Opinion for Application No. PCT/US2021/032585 dated Aug. 17, 2021, 6 pages.

Primary Examiner — James C Yager
(74) Attorney, Agent, or Firm — Mueting Raasch Group

(57) ABSTRACT

A thermoset undercoating composition for a food or beverage container or other packaging container, the thermoset undercoating composition comprising a binder polymer, an adhesion promoting additive comprising an aminoplast resin having at least one reactive group having an ethylenically unsaturated double bond that is reactive under free-radical curing conditions, an optional crosslinker configured to react with the binder polymer upon thermal curing of the thermoset undercoating composition, wherein the optional crosslinker preferably does not include groups that are reactive under free-radical curing conditions, and a liquid carrier.

20 Claims, No Drawings

THERMOSET UNDERCOATING COMPOSITIONS COMPATIBLE WITH FREE-RADICALLY CURED OVERCOATING FOR METAL SUBSTRATES

CROSS-REFERENCE TO RELATED APPLICATIONS

This application is a National Phase application, filed under 35 U.S.C. § 371, of International Application No. PCT/US2021/032585, filed on May 14, 2021, which claims the benefit of U.S. Provisional Application No. 63/025,364 filed on May 15, 2020, the entirety of which is incorporated herein by reference.

BACKGROUND

Coatings are typically applied to packaging articles such as the interior and exterior surfaces of metal food and beverage containers to protect the metal substrate. Contact between the metal and the packaged product or the external environment can lead to corrosion of the metal container. This is particularly true when the contents of the container are chemically aggressive in nature. Protective coatings are also applied to the surfaces of food and beverage containers to prevent corrosion in the headspace of the container between the fill line of the food product and the container lid and to protect the exterior of the container.

Packaging coatings should preferably be capable of high-speed application to the substrate and provide the necessary properties when hardened to perform in this demanding end use. For example, the exterior coating should have excellent adhesion to the substrate, resist abrasion, staining, and other coating defects such as "popping," "blushing" or "blistering," and resist degradation over long periods of time, even when exposed to harsh environments. In addition, the coating should generally be capable of maintaining suitable film integrity during container fabrication and be capable of withstanding the processing conditions that the container may be subjected to during product packaging.

The exterior surface of a food or beverage container may receive additional decorative overcoatings or protective varnishes that are adhered to the containers. Such decorative overcoatings may include ink-based compositions that are printed on the food or beverage container to produce illustrative designs and other insignia on the food or beverage container. The additional coatings may be applied as a single layer or as multiple coating layers and may or may not be cured in-between application of the different layers. The mechanisms for curing the additional layers can vary and but mostly rely on either a thermal curing process (e.g., heat baked curing) or a free-radically driven curing process (e.g., irradiation cured).

Decorative overcoats that use a free-radically driven curing process may provide some advantages over thermally cured ink-based compositions, but often will suffer from adhesion issues with applied to a thermoset undercoating. What is needed in the marketplace is a universal thermoset undercoating that provides sufficient adhesion to the underlying metal substrate as well as sufficient adhesion to both thermally cured and free-radically cured overcoats.

SUMMARY

This invention provides in one aspect a thermoset undercoating composition for use on a metal substrate such as a food or beverage container. The thermoset undercoating composition includes a binder polymer and an adhesion promoting additive capable of providing both good wetting and adhesion properties with subsequently applied decorative, thermally cured overcoatings as well as with decorative, free-radically cured overcoatings. The adhesion promoting additive preferably includes an aminoplast resin having one or more reactive molecular groups that include an ethylenically unsaturated double bond that is reactive under free-radical curing conditions. In some embodiments, the aminoplast resin includes a melamine, a benzoguanamine, or a urea backbone, or combinations thereof.

The present invention provides in another aspect a thermoset undercoating composition for a food or beverage container, the thermoset undercoating composition comprising:
- a binder polymer;
- an adhesion promoting additive comprising an aminoplast resin having at least one reactive group having an ethylenically unsaturated double bond that is reactive under free-radical curing conditions;
- an optional crosslinker configured to react with the binder polymer upon thermal curing of the thermoset undercoating composition, wherein the optional crosslinker does not include groups that are reactive under free-radical curing conditions; and
- a liquid carrier.

The present invention provides in yet another aspect a packaging article for a food or beverage container comprising a container, or a portion thereof, comprising a metal substrate and a multi-layer coating system applied on at least a portion of the metal substrate. The multi-layer coating system comprises:
(i) a thermoset undercoating derived from a thermoset undercoating composition, the thermoset undercoating composition comprising a binder polymer; an optional crosslinker configured to react with the binder polymer upon thermal curing of the thermoset undercoating composition, wherein the optional crosslinker does not include groups that are reactive under free-radical curing conditions; and an adhesion promoting additive comprising an aminoplast resin having at least one reactive group having an ethylenically unsaturated double bond that is reactive under free-radical curing conditions; and
(ii) at least one additional coating on the thermoset undercoating, the at least one additional coating being derived from a second coating composition comprising at least one of a free-radically curable composition or a thermally curable composition.

The present invention provides in another aspect a method of forming a packaging article, comprising the steps of:
coating at least a portion of a metal substrate for a food or beverage container with a thermoset undercoating composition, the thermoset undercoating composition comprising a binder polymer, an optional crosslinker configured to react with the binder polymer upon thermal curing of the thermoset undercoating composition, wherein the optional crosslinker does not include groups that are reactive under free-radical curing conditions, and an adhesion promoting additive comprising an aminoplast resin having at least one reactive group having an ethylenically unsaturated double bond that is reactive under free-radical curing conditions;
thermally curing the thermoset undercoating composition to form a thermoset undercoating on the metal substrate;

coating the thermoset undercoating with a second coating composition comprising at least one of a free-radically curable composition or a thermally curable composition; and curing the second coating composition to form the at least one additional coating on the thermoset undercoating.

In some embodiments, the invention provides a method of forming food or beverage cans, or a portion thereof, that includes applying a thermoset undercoating composition described herein on a metal substrate (e.g., applying the thermoset undercoating composition directly on a metal substrate in the form of a planar coil, sheet, or a curvilinear surface such as a beverage can), hardening the thermoset undercoating composition, and forming the metal substrate into a food or beverage can or a portion thereof.

In certain embodiments, forming the metal substrate into an article includes forming the substrate into a can end or a can body. In certain embodiments, the article is a two-piece drawn food can, three-piece food can, food can end, drawn and ironed food or beverage can, beverage can end, twist-off closure lid, and the like. Suitable metal substrates include, for example, aluminum, iron, steel or plated steel (e.g., tin-, chrome-, chromium-free, or nickel plated steel).

In certain embodiments, a packaging article is provided having (a) a thermally cured thermoset undercoating as disclosed herein disposed on at least a portion of an exterior surface of the article, (b) one or more additional decorative overcoating on the thermoset undercoating, and (c) a product packaged within the article such as a food, beverage, cosmetic, medicinal product, or industrial products.

The above summary of the present invention is not intended to describe each disclosed embodiment or every implementation of the present invention. The description that follows more particularly exemplifies illustrative examples. In several places throughout the application, guidance is provided through lists of examples, which examples can be used in various combinations. In each instance, the recited list serves only as a representative group and should not be interpreted as an exclusive list. Unless otherwise indicated, the structural representations included herein are not intended to indicate any particular stereochemistry and are intended to encompass all stereoisomers.

DEFINITIONS

As used herein, "a," "an," "the," "at least one," and "one or more" are used interchangeably. Thus, for example, a thermoset undercoating composition that comprises "a" polyether can be interpreted to mean that the thermoset undercoating composition includes "one or more" polyethers.

The term "aryl group" (e.g., an arylene group) refers to a closed aromatic ring or ring system such as phenylene, naphthylene, biphenylene, fluorenylene, and indenyl, as well as heteroarylene groups (e.g., a closed aromatic or aromatic-like ring hydrocarbon or ring system in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "arylene" or "heteroarylene" groups (e.g., furylene, pyridylene, etc.)

The term "colored layer" refers to a layer that possess a hue and is neither white, black, nor clear.

The term "comprises" and variations thereof do not have a limiting meaning where these terms appear in the description and claims.

The term "crosslinker" refers to a molecule capable of forming a covalent linkage between polymers or between two different regions of the same polymer when subjected to thermal or free-radical curing conditions depending on the type of composition. A crosslinker used within the thermoset undercoating composition described herein refers to a compound that undergoes self-crosslinking or crosslinking with the binder polymer or other materials in the thermoset undercoating composition under thermal curing conditions.

The term "dry solids" or on a "dry solids basis" refers to the total weight of all the materials in a particular mixture that remain after drying the mixture to remove the liquid carrier (e.g., solvent) from the mixture.

The term "ethylenically unsaturated double bond" refers to a non-aromatic carbon-to-carbon double bond capable of undergoing free-radically driven polymerization. Ethylenically unsaturated double bonds may include, but are not limited to, double bonds provided by vinylic groups, allylic groups, (meth)acryl groups, other $\alpha,\beta$ unsaturated groups, alkenyl groups, alkynes, and the like.

The term "exterior surface" refers to the substrate surface of an article (typically an exterior surface of a food or beverage container) that is displayed to the consumer and not intended to be in contact with a food or beverage product during the storage life of the article. The exterior surface may be considered the surfaces of the article that do not form part of the food-contact surface. While the exterior surface of an article may intentionally or unintentionally contact the food or beverage during packaging or consumption of the food or beverage, the exterior surface does not form a food-contact surface during the storage life of the article.

The term "decorative overcoating" refers to an overcoat derived from a thermally or free-radically curable composition that includes one or more inks, dyes, colorants, pigments, or the like designed to be printed on the undercoating under a high speed application to product information, branding insignia, or other illustrative design dress to the article. Such decorating coatings can include opaque single or multi-colored layers including white or black. The decorative overcoating may be patterned, contain numbers, letters, pictures, or other graphical illustrations and designs that catch the attention of the consumer and improve the overall visual aesthetics of the packaging article. Decorative overcoating will typically produce a colored or multi-colored layer, but in some embodiments may be used to produce white or black layers or combinations thereof.

The terms "a first," "a second," "a third" and the like are used to distinguish between separate components and are not intended to imply a particular quantity or order unless described otherwise. By way of example, a "second layer" being on a "first layer" is used to indicate the system includes at least two different layers. Additional layers, such as a "third layer" may likewise be present in the system and may be positioned on, under, or in-between the first and second layers depending on how the layer configuration is described.

The term "food-contact surface" or "interior surface" refers to the substrate surface of an article (typically an inner surface of a food or beverage container) that is in contact with, or intended for contact with, a food or beverage product. By way of example, an interior surface of a metal substrate of a food or beverage container, or a portion thereof, is a food-contact surface even if the interior metal surface is coated with a coating composition and does not directly contact the food or beverage.

The term "free-radical curable composition" refers to composition that predominately or fully cure via a free-radical mechanism under free-radical curing conditions.

The term "free-radical curing conditions" includes conventional radiation curing conditions such as exposure to UV lamps (e.g., wavelength equal to 250 nm to 400 nm and energy ranges of about 5 eV to about 100 eV or exposure electron radiation in the range of 150 to 300 keV), heat initiated free-radical reaction, or combinations thereof. In examples where a reaction or non-reaction is assessed under free-radical curing conditions, the materials may be tested upon EB dose of about 1 MRad to about 3 MRad or a UV dose of about 100 mJ/cm$^2$ to about 300 mJ/cm$^2$.

A molecular group that may be the same or different is referred to as being "independently" something.

Unless otherwise indicated, a reference to a "(meth) acrylate" compound or group (where "meth" is in parenthesis) is meant to include acrylate, methacrylate, or both.

The term "mobile" means that the compound can be extracted from the cured coating when a coating (typically ~1 mg/cm$^2$ (6.5 mg/in$^2$) thick) is exposed to a test medium for some defined set of conditions, depending on the end use. An example of these testing conditions is exposure of the cured coating to HPLC-grade acetonitrile for 24 hours at 25° C. If the aforementioned phrases are used without the term "mobile" (e.g., "substantially free of BPA") then the recited polymer or composition contains less than the aforementioned amount of the compound whether the compound is mobile in the coatings or bound to a constituent of the coatings as assessed using the empirical formulas for such compound and constituent.

The term "multi-coat coating system" refers to a coating system that includes at least two different layers. In contrast, a "mono-coat coating system" as used herein refers to a coating system that includes only a single coating composition. In either example, a single coating composition may be applied in more than one pass.

As used herein, the term "organic group" means a hydrocarbon group (with optional elements other than carbon and hydrogen, such as oxygen, nitrogen, sulfur, and silicon) that is classified as an aliphatic group, a cyclic group, or combination of aliphatic and cyclic groups (e.g., alkaryl and aralkyl groups). The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups.

Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with 0, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents that will be familiar to those in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that includes the moiety.

Unless otherwise indicated, the term "polymer" includes both homopolymers and copolymers (e.g., polymers of two or more different monomers). Similarly, unless otherwise indicated, the use of a term designating a polymer class such as, for example, "polyether" is intended to include both homopolymers and copolymers (e.g., polyether-ester copolymers) and typically refers to a macromolecule that includes multiple repeating monomer units.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

The term "on," when used in the context of a coating applied on a surface or substrate, includes both coatings applied directly or indirectly to the surface or substrate. Thus, for example, a coating applied to an undercoating layer that overlies a substrate constitutes the coating applied on the substrate. In comparison, the phrase "directly on," when used in the context of a coating applied directly on a surface or substrate, refers to the coating in direct contact with the surface or substrate without the presence of any intermediate layers or coatings there between.

The term "overcoat," "overcoating," or "overcoating composition" means a coating composition applied on an undercoat composition or on one or more intermediate layers applied on an undercoat composition. The term "overcoat" includes topcoats and the intermediate layer coatings.

The term "reactive under free-radical curing conditions" refers to compounds or molecular groups that are understood to generate free radicals under conventional radiation curing techniques or react with those free-radicals generated. A compound that contains a molecular group that is reactive under free-radical curing conditions refers to a compound that will undergo reactions involving free-radical moieties promoting polymerization under ultra violet (UV), heat, or electron radiation curing conditions or compounds that are considered free radical initiators or promoters (e.g., peroxides and azo compounds). Conversely, a compound that does not include molecular groups that are reactive under free-radical curing conditions refers to a compound that excludes such groups that do not undergo free-radical reactions or polymerization under conventional free radical curing conditions.

The term "resin" refers to an oligomer or a polymer.

The term "substantially free" of a particular mobile compound means that the recited polymer or composition contains less than 100 parts per million (ppm) of the recited mobile compound. The term "essentially free" of a particular mobile compound means that the recited polymer or composition contains less than 5 parts per million (ppm) of the recited mobile compound. The term "completely free" of a particular mobile compound means that the recited polymer or composition contains less than 20 parts per billion (ppb) of the recited mobile compound.

The term "substantially non-reactive", when used in the context of ethylenically unsaturated double bonds of the adhesion promoting additive being substantially non-reactive during thermal curing, refers to ethylenically unsaturated double bonds in which no more than 10% of such double bonds, if any, in the adhesion promoting additive are consumed under thermal curing conditions of up to 200° C. for up to 30 minutes such that at least 90% of the ethylenically unsaturated double bonds remain unreacted within the composition after undergoing thermal curing. In some examples, FTIR may be used to determine the proportion of acrylic double-bonds within a composition that have disappeared through any reaction using well-known absorption bands (e.g., 810 $cm^2$ and others). Additionally, or alternatively the iodine value of the composition may be measured and used to characterize the number of non-aromatic double bonds present in a material.

The term "thermal curing conditions" include conventional thermal curing conditions such as exposure to a heated environment of about 100° C. to about 300° C., and more typically from about 177° C. to about 250° C. for up to several minutes. In some embodiments, thermal curing may include heating to a part metal temperature (PMT) of about 240° C. to about 250° C. for about 10 to about 30 seconds. In examples where a reaction or non-reaction is assessed under thermal curing conditions, the materials may be tested upon being exposed to a heated environment of about up to 200° C. for up to 30 minutes.

The term "total resin solids" refers to the total weight of the non-volatile binder polymer, adhesion promoting additive, crosslinker, and filler polymers within a composition.

The term "undercoat," "undercoating," or "undercoating composition" means a coating composition to be applied on a substrate that receives an additional coating composition applied on at least a portion thereon such that at least part of the undercoating is positioned between the substrate and the additional coating. The term includes basecoats and primer coats. While in preferred embodiments the undercoating is applied directly on an exterior surface of the underlying metal substrate, the metal substrate may be chemically treated prior to the undercoating application. Such chemical treatments may modify the surface of the metal substrate but are not considered as forming a coating on the substrate. The undercoat generally refers to the first curable layer applied to the metal substrate.

"Wet-on-wet" refers to multi-layer coating techniques where multiple layers of coating compositions are be applied to a substrate sequentially such that each layer might still be partially wet or not fully cured when the subsequent layers are applied. In most instances, it is believed that functionality of the coating composition may penetrate through the adjacent wet-on-wet layers to bond via chemical or physical adhesion between the layers.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all sub-ranges included within the broader range (e.g., 1 to 5 discloses 1 to 4, 1.5 to 4.5, 4 to 5, etc.).

DETAILED DESCRIPTION OF ILLUSTRATIVE EMBODIMENTS

In one aspect, the present invention provides a thermoset undercoating composition that includes a binder polymer, and preferably a binder polymer having one or more reactive groups to facilitate thermal cure of the coating; an adhesion promoting additive that includes an aminoplast resin having one or more reactive groups, the one or more reactive groups preferably having an ethylenically unsaturated double bond; and an optional crosslinker configured to react with the binder polymer (or with itself) upon thermal curing of the thermoset undercoating composition. The adhesion promoting additive may be included within the thermoset undercoating composition in relatively small amounts to provide the thermoset undercoat with good compatibility to subsequently applied free-radically or thermally cured decorative overcoating and protective varnishes.

A described further below, the thermoset undercoating compositions of the present disclosure are designed to be applied to metal substrates of packaging articles such as food or beverage containers. In preferred embodiments, the thermoset undercoating compositions may be used to form a universal undercoating that exhibits good compatibility with both free-radically cured and thermally cured decorative overcoats and varnishes. For example, several challenges exist with wet-on-wet application of the multiple coating layers. The underlying layer may receive strong mechanical impact from the application of subsequent coating layers due to the stress of application (tack) and because of the described interpenetration of the layers. Additionally, or alternatively, local decohesion of the underlying layer may occur, leading to contamination of the subsequent layers (e.g., color bleeding) or dewetting or other visual imperfections may occur. Good compatibility between the layers may reduce and preferably eliminate the impact of one or more of these effects on the integrity of the final coating.

The thermoset undercoating compositions includes one or more binder polymers. The adhesion promoting additive described herein may function substantially independently of the binder polymer and of crosslinkers included in the thermoset undercoating composition and, thus, the particulars of the binder polymer may not be relevant provided the binder polymer is suitable for a thermoset composition and is substantially free, essentially free, or completely free of materials or substituents that would react with the ethylenically unsaturated double bond on the adhesion promoting additive during thermal curing conditions (e.g., heating up to 200° C. for up to 30 minutes).

The binder polymer may be any suitable type and, moreover, may optionally be a mixture and/or copolymer of two or more different polymers. Examples of suitably binder polymers may include polyethers, polyester, polyolefins, acrylics or other vinyl polymers (e.g., organic solution polymerized acrylics, emulsion polymerized latexes and the like, or combinations thereof), polyurethanes, polyamides, or copolymers or mixtures thereof.

The backbone of the binder polymer may include any suitable terminal or pendants groups, including, for example, epoxy groups, hydroxyl groups (e.g., a hydroxyl group attached to a terminal aryl or heteroaryl ring), acid or anhydride groups, or a combination thereof, provided such groups are substantially non-reactive or do not react with the ethylenically unsaturated double bond of the adhesion promoting additive. Representative groups that may react with the ethylenically unsaturated double bond and thus are preferably avoided may include non-tertiary amines, thiols, peroxides, halogens if using EB-curing, photoinitiators, and electron-donor groups. In preferred embodiments, the binder polymer includes at least one hydroxyl group, and more preferably a plurality of hydroxyl groups. The one or more hydroxyl groups can be located at any suitable location. For example, the hydroxyl groups can be located at one or both terminal ends of a polymer backbone, one or more pendant locations along the polymer backbone (e.g., in a structural unit derived from a triol such as trimethylolpropane), or a combination thereof. For example, the binder polymer backbone may include secondary hydroxyl groups distributed throughout. Preferred secondary hydroxyl groups may be present in —$CH_2$—CH(OH)—$CH_2$— or —$CH_2$—$CH_2$—CH(OH)— segments, which in some embodiments are derived from an oxirane group. Such segments may be formed, for example, via reaction of an oxirane group and a hydroxyl group (e.g., a hydroxyl group of a polyhydric phenol).

The binder polymer may have any suitable hydroxyl number. Hydroxyl numbers are typically expressed as milligrams of potassium hydroxide (KOH) equivalent to the hydroxyl content of 1 gram of the hydroxyl-containing substance. Methods for determining hydroxyl numbers will be familiar to those in the art. See, for example, ASTM D1957-86 (Reap proved 2001) entitled "Standard Test Method for Hydroxyl Value of Fatty Oils and Acids' and available from the American Society for Testing and Materials International of West Conshohocken, Pa. In some embodiments, the binder polymer may be characterized as a polyether, polyester, or both having a hydroxyl number of about 10 to about 150, more preferably about 20 to about 100, and even more preferably from about 30 to about 60.

In some embodiments, the backbone of the binder polymer may include any suitable step-growth linkages (e.g., condensing linkages) or combination of two or more different step-growth linkages, including, for example amide linkages, carbonate linkages, ester linkages, ether linkages, urea linkages, urethane linkages, etc. For example, the backbone of the binder polymer may include both ester and ether linkages.

Preferred binder polymers have at least one, and more preferably at least two functional groups capable of undergoing a chemical reaction (preferably a cross-linking reaction) with another component of the thermoset undercoating other than the ethylenically unsaturated double bond of the adhesion promoting additive during thermal curing of the composition. In some embodiments, the binder polymer is capable of forming a covalent linkage with a functional group of the optional crosslinker (e.g., a phenolic crosslinker, an aminoplast crosslinker different that an aminoplast resin of the adhesions promoter, a blocked isocyanate crosslinker, or a beta-hydroxyalkyl amide crosslinker) or with one or more groups of the adhesion promoting additives other than the ethylenically unsaturated double bonds. Examples of suitable functional groups for the binder polymer include hydroxyl groups, carboxyl groups (including, e.g., precursor or derivative groups such as anhydride or ester groups), phenol-containing reactive groups (see, e.g., those described in U.S. Pat. No. 9,096,772), blocked isocyanate groups (see, e.g., those described in U.S. Pat. No. 8,574,672), beta-dicarbonyl groups (see, e.g., those described in International Publ. No. WO2018/119175) and combinations thereof.

In some embodiments, the binder polymer as well as other ingredients do not include any structural units derived or derivable from bisphenols such as bisphenol A (BPA), bisphenol F (BPF), or bisphenol S (BPS).

The disclosed thermoset undercoating compositions preferably include at least a film-forming amount of a binder polymer and less than 10 wt. % of the adhesion promoting additive on a total resin solids basis. The amount of binder polymer included in thermoset undercoating compositions may vary depending on a variety of considerations such as, for example, the method of application, the presence of other film-forming materials, whether the thermoset undercoating composition is a water-based or solvent-based system, whether the thermoset undercoating composition includes pigments, etc. For liquid-based thermoset undercoating compositions, however, the binder polymer will typically constitute at least 10 wt. %, more typically at least 30 wt. %, and even more typically at least 50 wt. % of the thermoset undercoating composition, based on the total weight of dry solids in the thermoset undercoating composition. For such liquid-based thermoset undercoating compositions, the binder polymer will typically constitute less than about 90 wt. %, less than about 80 wt. % or less than 70 wt. % of the binder polymer based on total resin solids in the thermoset undercoating composition.

Several example binder polymers suitable for use in a thermoset undercoating composition exist in and will be familiar to those in the art including, for example, U.S. Patent Application Publication No. 2018/0112101, which is incorporated by reference in its entirety. Some commercially available binder polymers for use in the disclosed thermoset undercoating composition may include PARALOID™ by Dow Chemical, DYNAPOL® polyesters by Evonik, EPON™ epoxy resins by Hexion, alkyds by DIC Corp., vinyl resins by Wacker, cellulose-derived resins by Eastman, and elastomeric resins by Cray Valley.

The thermoset undercoating composition also includes an adhesion promoting additive, which preferably enhances the compatibility of the cured thermoset undercoating with either free-radically cured or thermally cured overcoats. For example, in certain preferred embodiments, the adhesion promoting additive helps to improve the adhesion with subsequently applied free-radically cured overcoats by providing a reactive chemical group that crosslinks with the free-radically cured overcoat, while also enhancing, or at least having little to no impact on the wetting properties of the thermoset undercoating when used with subsequently applied thermally cured overcoats.

The adhesion promoting additive preferably includes an aminoplast resin having one or more reactive groups having an ethylenically unsaturated double bond. While not intending to be bound by theory, aminoplast resins have a tendency, to a more or less pronounced degree, depending on their underlying structure and composition and somewhat independent of the surrounding compositional elements of the coating, to naturally migrate to the outer interfaces (e.g., exterior surface) of the thermoset undercoating composition during thermal curing conditions. Thus, by incorporating an adhesion promoting additive that includes an aminoplast resin having one or more ethylenically unsaturated double bonds into the thermoset undercoating composition, it is believed the adhesion promoting additive will naturally migrate, at least partly, toward the exterior surface of the thermoset undercoating during the thermal curing process, thereby enhancing the availability of the ethylenically unsaturated double bonds at the exterior surface of the undercoating. The ethylenically unsaturated double bonds are then accessible and capable of co-reacting with ethylenically unsaturated double bonds present in the free-radically curable/cured overcoats to create strong, covalent bonds between the thermoset undercoating and the subsequently applied free-radically cured decorative overcoat. Additionally, or alternatively, other functional groups naturally available in the aminoplast resin may be capable of covalently bonding with the binder polymer to further inhibit mobility of the resin in the cured thermoset undercoating.

Bonding performance with free-radically cured overcoats is improved when the reactive ethylenically unsaturated double bonds of the adhesion promoting additive are well-preserved through the thermal drying or baking stage of the thermoset undercoating (which may be in combined or separate steps) and when the double bonds are sufficiently dense and evenly distributed at the exterior surface of the thermoset undercoat. Preservation of the double bonds is preferably obtained by selection of materials included in the thermoset undercoat that are substantially non-reactive with the ethylenically unsaturated double bonds. The other materials of the thermoset undercoating composition should preferably be free of free-radical polymerizable double bonds, free-radical initiators or promoters, halogens, and substituent groups that would chemically react with the ethylenically unsaturated double bond. In some embodiments, the undercoating composition does not include any intentionally added other ingredients including such features, although trace detectable amounts may still be present, for example, due to environmental contamination and the sensitivity of modern analytical test methods. Such substituent groups that should be avoided include, for example, non-tertiary amines, peroxides, halogens, azos, thiols, photoinitiators, electron-donor groups, and the like. Other materials of the thermoset undercoating composition that include or are characterized as having a mix of free-radically curable and thermally curable ingredients or substituents (e.g., dual-cure ingredients) should be excluded from the composition.

Further, the strong adhesion forces can be obtained by including relatively small amounts of the adhesion promoting additives into the thermoset undercoating composition (e.g., less than 15 wt. %, less than 10 wt. %, or less than 5 wt. %, based on the dry solids weight of the thermoset undercoating or more than 0.1 wt. %, more than 0.5 wt. %, or more than 1 wt. %). The low amount and chemical nature of the adhesion promoting additive helps to reduce any interference the adhesion promoting additives may exert with the wetting and adhesion properties of the thermoset undercoating to subsequently applied thermally cured decorative overcoats. For example, when thermally cured decorative overcoats are applied, the thermoset undercoating may not be exposed to free-radical curing condition and the ethylenically unsaturated double bond may remain unreacted in the final multi-coat system, which may otherwise be detrimental to the properties of the coating. While not intending to be bound by theory, having a relatively low amount of the adhesion promoting additive combined with the chemical nature of additive in the thermoset undercoating will help ensure that the adhesion promoting additive does not fully obstruct or cover the exterior surface of the thermoset undercoating or interfere with the coating of the thermally cured overcoats to the undercoating.

In some embodiments, the adhesion promoting additive may at least partially crosslink with other materials in the thermoset undercoating composition while leaving the ethylenically unsaturated double bond available for crosslinking with materials in a subsequently applied free-radically curable overcoat. For example, amino-based resins may be used in the thermoset undercoating composition as crosslinking agents for functionalized binder polymers such as polyether, polyester, acrylics, and others, or even used for their ability to crosslink on their own under thermal curing conditions. By employing an adhesion promoting additive that contains such an amino resin, the adhesion promoting additive may exhibit a higher bonding affinity to other materials within the thermoset undercoating composition such as the binder polymer or optional crosslinkers, thereby reducing the likelihood that the adhesion promoting additive will migrate out of the undercoating and into an adjacent coating layer. In preferred embodiments, this bonding ought to be made to happen later in the crosslinking process to allow the additive to migrate to the surface first before being bound to the other materials.

Aminoplast resins can also provide beneficial coating characteristics to the undercoating composition such as improved wetting properties when applied to a metal substrate or improved adhesion of the resultant cured undercoat to the metal substrate. Additionally, or alternatively, aminoplast resins can contribute to the top surface properties of the coating such as flow, and scratch resistance.

Preferred embodiments of the adhesion promoting additives described in this invention are substantially clear and non-yellowing. Accordingly, the adhesion promoting additives preferably have minimal if any influence on the color characteristics of the cured thermoset overcoatings. This allows the adhesion promoting additives to be used in white undercoats that are intended to provide a desirable basecoat for subsequently applied decorative overcoats.

Suitable aminoplast resins for use as the adhesion promoting additive may include reaction products of (i) aldehydes such as formaldehyde, acetaldehyde, crotonaldehyde, and benzaldehyde with (ii) amino- or amido-group-containing substances such as urea, melamine, and benzoguanamine that have undergone additional addition reactions to include one or more reactive groups having ethylenically unsaturated double bonds and optionally additional reactions with short chain alcohols, such as methanol, (iso)propanol, (iso)butanol and 2-ethylhexyl alcohol. Examples of preferred aminoplast resins include resins containing a melamine, a benzoguanamine, or a urea backbone such as, without limitation, benzoguanamine-formaldehyde resins, melamine-formaldehyde resins, etherified benzoguanamine-formaldehyde, etherified melamine-formaldehyde resins that have undergone an addition reaction to include reactive groups with the ethylenically unsaturated double bond, materials including a 1,3,5 triazine group such as 2-vinyl-4,6-diamino-1,3,5-triazine, and triallyl cyanurate. Although the ethylenically unsaturated double bonds may be incorporated in any suitable manner using any suitable technique, in certain preferred embodiments such double bonds are provided through the use of one or more vinylic type compounds. In some embodiments, the adhesion promoter additive may include aminoplast resins such as (meth)acrylated melamine resin (e.g., (meth)acrylated melamine formaldehyde), (meth)acrylated benzoguanamine resin (e.g., (meth)acrylated benzoguanamine formaldehyde), or (meth)acrylated urea resin.

In preferred embodiments, the adhesion promoting additive may include a modified melamine-group containing resin having a triazine ring and at least one, but preferably more than one, and most preferably at least three, ethylenically unsaturated substituent groups attached. The modified melamine resins (typically modified melamine-formaldehyde resins) may be prepared using techniques that would be understood by those in the art. For example, a melamine-based adhesion promoting additive may be synthesized by reacting a melamine group-containing polyol with (meth)acrylic acid or a derivative of (meth)acrylic acid, for example, (meth)acrylic anhydride, (meth)acryloyl chloride, (meth)acrylic esters, or the like.

Example techniques for preparing aminoplast resins containing (meth)acrylated groups and structures containing the same are described in, for example, U.S. Pat. Nos. 4,230,550, 4,266,053, and 5,296,571 and International Patent Application Publication No. WO 2014/090647. Commercially available aminoplast resins containing (meth)acrylated groups include, for example, MIRAMER SC9610 melamine acrylate available from Miwon Specialty Chemical Co. Ltd.; SARTOMER CN 890 melamine acrylate available from Sartomer Europe a division of Arkema; BOMAR® BMA-200 by Bomar, Etercure DR-M455 and DR-M458 by Eternal Materials.

The amount of adhesion promoting additive included in the thermoset undercoating composition may be relatively small. In some embodiments, the adhesion promoting additive may be included in the thermoset undercoating composition in such an amount that the adhesion promoting agent is insufficient to cause the thermoset undercoating coating composition to cure under free-radically curing conditions. Thus, even if exposed to free-radically curing conditions, the thermoset undercoating still remains in a liquid state and would not be considered to be a dual-cure coating composition by those in the art.

In some embodiments, the adhesion promoting additive may be included in the thermoset undercoating composition in an amount of less than about 10 wt. % on a dry solids basis, more preferably in the amount of about 0.05 wt. % to about 5 wt. % on a dry solids basis, and most preferably about 0.5 wt. % to about 1 wt. %. Due to the fact that the thermoset undercoating composition is not intended to be free-radically cured, and for some applications, may not be subjected to free-radically curing conditions during the application of the exterior multi-coat coating, using relatively small amounts of the adhesion promoting additive will reduce the relative amount of unbound material within the cured thermoset undercoating. A concentration of adhesion promoting additive within the disclosed range may help ensure that the adhesion promoting additive does not interfere with subsequently applied wet-on-wet or thermally cured overcoats.

Having the amount of adhesion promoting additive included in the thermoset undercoating remain relatively low also helps discourage the thermoset undercoat composition from exhibiting unwanted side effects such as a higher overall affinity for free-radically curable reaction mechanics at the detriment of the chemistry for thermoset mechanics. Having too high of a concentration of the adhesion promoting additive present within the thermoset undercoating composition may also negatively influence the wetting ability of the resultant cured thermoset undercoating. For example, due to the tendency of aminoplast resins to naturally migrate toward the exterior surface of the undercoating upon drying and thermally curing the thermoset undercoating composition, the surface concentration of the adhesion promoting additive may displace or effectively compete with other agents included in the thermoset undercoating composition such as the binder polymer or other additives like surfactants that help control the wetting, flow, foaming, and other properties of the undercoating.

The disclosed thermoset undercoating composition may also include other optional ingredients that do not adversely affect the thermoset undercoating composition or a cured thermoset undercoating composition resulting therefrom. Such optional ingredients are typically included in a thermoset undercoating composition to enhance composition esthetics; to facilitate manufacturing, processing, handling, and application of the composition; and to further improve a particular functional property of a thermoset undercoating composition or a cured thermoset undercoating composition resulting therefrom. For example, the thermoset undercoating composition may optionally include crosslinkers; pigments, dyes, colorants, or toners; fillers materials; lubricants; surfactants; antioxidants; and the like to provide the desired film properties. Each optional ingredient is preferably included in a sufficient amount to serve its intended purpose, but not in such an amount to adversely affect a thermoset undercoating composition or a cured thermoset undercoating composition resulting therefrom.

In some embodiments, the thermoset undercoating composition may include one or more optional crosslinkers that are chemically different from the adhesion promoting additive. The choice of optional crosslinker may depend on the particular product being formulated. For example, some thermoset undercoating compositions are highly colored (e.g., gold-colored coatings). These coatings may typically be formulated using crosslinkers that tend to have a yellowish color. In contrast, white coatings are generally formulated using non-yellowing crosslinkers.

Suitable examples of optional crosslinkers may include hydroxyl-reactive curing resins such as phenoplasts, aminoplast, blocked or unblocked isocyanates, or mixtures thereof. Suitable phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol. Suitable aminoplast resins are the condensation products of aldehydes such as formaldehyde, acetaldehyde, crotonaldehyde, and benzaldehyde with amino- or amido-group-containing substances such as urea, melamine, and benzoguanamine. Examples of optional aminoplast crosslinking resins include, without limitation, benzoguanamine-formaldehyde resins, melamine-formaldehyde resins, etherified melamine-formaldehyde, and urea-formaldehyde resins. In contrast with the adhesion promoting additive, such optional aminoplast crosslinking resins would preferably not include any reactive ethylenically unsaturated double bonds or moieties capable of reacting with ethylenically unsaturated double bonds.

Examples of other generally suitable optional crosslinking agents are the blocked or non-blocked aliphatic, cycloaliphatic or aromatic di-, tri-, or poly-valent isocyanates, such as hexamethylene diisocyanate, cyclohexyl-1,4-diisocyanate, and the like. Further non-limiting examples of generally suitable optional blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, optional blocked isocyanates are used that have an Mn of at least about 300, more preferably at least about 650, and even more preferably at least about 1,000.

Optional polymeric blocked isocyanates are useful in certain embodiments. Some examples of suitable polymeric blocked isocyanates include a biuret or isocyanurate of a diisocyanate, a trifunctional "trimer," or a mixture thereof. Examples of optional blocked polymeric isocyanates include TRIXENE BI 7951, TRIXENE BI 7984, TRIXENE BI 7963, TRIXENE BI 7981 (TRIXENE materials are available from Baxenden Chemicals, Ltd., Accrington, Lancashire, England), DESMODUR BL 3175A, DESMODUR BL3272, DESMODUR BL3370, DESMODUR BL 3475, DESMODUR BL 4265, DESMODUR PL 340, DESMODUR VP LS 2078, DESMODUR VP LS 2117, and DESMODUR VP LS 2352 (DESMODUR materials are available from Bayer Corp., Pittsburgh, PA, USA), or combinations thereof. Examples of suitable trimers may include a trimerization product prepared from on average three diisocyanate molecules or a trimer prepared from on average three moles of diisocyanate (e.g., HMDI) reacted with one mole of another compound such as, for example, a triol (e.g., trimethylolpropane).

The level of optional crosslinking agent used will typically depend on the type of crosslinking agent, the time and temperature of the bake, the molecular weight of the binder polymer, the amount of adhesion promoting additive present in the composition, and the desired coating properties. If used, the crosslinker is typically present in an amount of less than 50 wt. %, less than 30 wt. %, less than 15 wt. %, or less than 7 wt. %. These weight percentages are based upon the total weight of the dry solids in the thermoset undercoating composition. In some embodiments where the crosslinker includes an aminoplast resin, the amount of optional crosslinking agent used in the thermoset undercoating composition may reduced or offset by the amount of adhesion promoting additive included.

In addition to the binder polymer, adhesion promoting additive, and optional crosslinker, the disclosed thermoset undercoating composition can include a liquid carrier. The liquid carrier may be water, organic solvent, or mixtures of various such liquid carriers. Accordingly, liquid thermoset undercoating compositions disclosed herein may be either water-based or solvent-based systems. Examples of suitable organic solvents include glycol ethers, alcohols, aromatic or aliphatic hydrocarbons, dibasic esters, ketones, esters, and the like, and combinations thereof. Preferably, such carriers are selected to provide a dispersion or solution of the binder polymer and adhesion promoting additive for further formulation. Although thermoset undercoating compositions including a liquid carrier are presently preferred, in other embodiments the disclosed thermoset undercoating composition may have utility in solid coating application techniques such as, for example, powder coating.

Another useful optional ingredient for the thermoset undercoating composition is a pigment including for example, calcium silicates such as, e.g., wollastonite; barium sulfate; calcium carbonate; mica; talc; silica; iron oxide; titanium dioxide; carbon black; phthalocyanines; chromium oxide; and combinations thereof. The pigment may be included to change the opacity or color of the resultant thermoset undercoating. In preferred embodiments, the thermoset undercoating composition may include one or more pigments such as titanium dioxide that form a white undercoat. The white undercoat acts as a useful base coat for subsequently applied colorful decorative overcoatings. If used, a pigment is present in the thermoset undercoating composition in an amount of no greater than 70 wt. %, more preferably no greater than 50 wt. %, and even more preferably no greater than 40 wt. %, based on the total weight of dry solids in the thermoset undercoating composition. In some embodiments, the thermoset undercoating may include predominately a mixture of binder (e.g., polyester resin) and pigments.

Another useful optional ingredient is a lubricant (e.g., a wax), which facilitates manufacture of fabricated metal articles (e.g., closures and food or beverage can ends) by imparting lubricity to sheets of coated metal substrate. Non-limiting examples of suitable lubricants include, for example, natural waxes such as Carnauba wax or lanolin wax, polytetrafluoroethane (PTFE) and polyethylene-type lubricants. If used, a lubricant is preferably present in the thermoset undercoating composition in an amount of at least 0.1 wt. %, and preferably no greater than 2 wt. %, and more preferably no greater than 1 wt. %, based on the total weight of the dry solids in the thermoset undercoating composition.

Surfactants can be optionally added to the thermoset undercoating composition to aid in flow and wetting of the thermoset undercoating on the substrate. Examples of surfactants, include, but are not limited to, nonylphenol polyethers and salts and similar surfactants that will be familiar to those in the art. If included, a surfactant is preferably present in an amount of at least 0.01 wt. %, and more preferably at least 0.1 wt. %, based on the weight of dry solids. If used, a surfactant is preferably present in an amount no greater than 10 wt. %, and more preferably no greater than 5 wt. %, based on the weight of dry solids.

In some embodiments, the thermoset undercoating composition may include an optional catalyst to increase the rate of cure but ought not to promote or initiate free-radical reactions. Examples of catalysts, include, but are not limited to, strong acids (e.g., phosphoric acid, dodecylbenzene sulphonic acid (DDBSA), available as CYCAT 600 from Cytec), methane sulfonic acid (MSA), p-toluene sulfonic acid (pTSA), dinonylnaphthalene disulfonic acid (DNNDSA), and triflic acid); Brönsted and Lewis acids; quaternary ammonium compounds; phosphorous compounds; and tin, titanium, and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts that will be familiar to persons skilled in the art. If used, a catalyst is preferably present in an amount of at least 0.01 wt. %, and more preferably at least 0.1 wt. %, based on the weight of the dry solids in the thermoset undercoating composition. If used, a catalyst is preferably present in an amount of no greater than 3 wt. %, and more preferably no greater than 1 wt. %, based on the weight of the dry solids in the thermoset undercoating composition.

The disclosed thermoset undercoating compositions may have utility in a variety of coating end uses, and especially packaging coating end uses. The disclosed thermoset undercoatings may be applied to the interior and exteriors of food and beverage containers to protect the underlying metal substrate. For example, contact between the metal substrate and the packaged product or the external environment can lead to corrosion of the metal container or degraded visual aesthetics. Additionally, or alternatively, the disclosed thermoset undercoating compositions may have utility in cosmetic packaging, medical packaging coating, or other packaging applications that include a metal substrate and one or more decorative overcoat layers.

In some embodiments, the disclosed thermoset undercoating composition may be applied to a packaging article such as a food or beverage container that includes a metal substrate. The metal substrate may be formed into a can end or a can body of a food or beverage container. In certain embodiments, the article is a two-piece drawn food can, three-piece food can, food can end, drawn and ironed food or beverage can, beverage can end, twist-off closure lid, and the like. Suitable metal substrates include, but are not limited to, aluminum, iron, steel or plated steel (e.g., tin-, chrome- or nickel plated steel). In preferred embodiments, the metal substrate used for the packaging article has an average thickness of about 0.14 millimeters (mm) to about 0.50 mm.

In preferred embodiments, the disclosed thermoset undercoating composition may be applied to an exterior surface of a beverage can. Such beverage cans include, but are not limited to, beer cans, carbonated soft drink cans, energy drink cans, isotonic drink cans, water cans, juice cans, tea cans, coffee cans, milk cans, and the like.

The disclosed thermoset undercoating may be applied to the metal substrate either prior to, or after, the substrate is formed into an article (such as, for example, a food or beverage container or a portion thereof). The thermoset undercoating compositions may be suitable, for example, for spray coating, coil coating, wash coating, sheet coating, silkscreen coating, roller coating, and side seam coating (e.g., food can side seam coating). A further discussion of such application methods, including the end uses associated therewith, is provided below.

In some embodiments, the thermoset undercoating composition may be spray coated onto the metal substrate. The spray process preferably utilizes a spray nozzle capable of uniformly coating the surface of the preformed packaging article. The sprayed preformed container is then subjected to heat to remove any residual carriers (e.g., water or solvents) and harden the undercoating. Typical preformed packaging articles suitable for spray coating include food cans, beer and beverage containers, and the like.

A coil coating is described as the coating of a continuous coil composed of a metal substrate (e.g., steel or aluminum). Once coated, the coating coil is subjected to a short thermal curing cycle for hardening (e.g., drying, curing, or both) of the undercoating. Coil coatings provide coated metal (e.g., steel or aluminum) substrates that can be fabricated into formed articles, such as two-piece drawn food cans, three-piece food cans, food can ends, drawn and ironed cans, beverage can ends, and the like. The article may then be coated with one or more decorative overcoating layers.

A wash coating is commercially described as the coating of the exterior of two-piece drawn and ironed ("D&I") cans with a thin layer of the thermoset undercoating. The exterior of these D&I cans are "wash-coated" by passing pre-formed two-piece D&I cans under a curtain of the thermoset undercoating composition. The cans are inverted, that is, the open end of the can is in the "down" position when passing through the curtain. This curtain of thermoset undercoating composition takes on a "waterfall-like" appearance. Once these cans pass under this curtain of thermoset undercoating composition, the liquid coating material effectively coats the exterior of each can. Excess coating is removed by an "air knife." Once the desired amount of coating is applied to the exterior of each can, each can is passed through a thermal curing oven to harden the undercoating.

A sheet coating is described as the coating of separate pieces of a variety of materials (e.g., steel or aluminum) that have been pre-cut into square or rectangular "sheets." Typical dimensions of these sheets are approximately one square meter. Once coated, each sheet is thermally cured. Once hardened, the sheets of the coated substrate are collected and prepared for subsequent fabrication. Sheet coatings provide coated metal (e.g., steel or aluminum) substrate that can be successfully fabricated into formed articles, such as two-piece drawn food cans, three-piece food cans, food can ends, drawn and ironed cans, beverage can ends (including, e.g., riveted beverage can ends having a rivet for attaching a pull tab thereto), and the like.

A side seam coating is described as the application of a powder coating or the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of coating, which protects the exposed "weld" from subsequent corrosion. The coatings that function in this role are termed "side seam stripes." Typical side seam stripes are spray applied and cured quickly via residual heat from the welding operation in addition to a small thermal oven.

Other commercial coating application and curing methods may also be used, for example, extrusion coating, laminating, powder coating, and the like.

After applying the thermoset undercoating composition onto a substrate, the composition can be cured using a variety of thermal processes, including, for example, oven baking by either conventional or convectional methods, or any other method that provides an elevated temperature suitable for curing the coating. The curing process may be performed in either discrete or combined steps. For example, substrates can be dried at ambient temperature to leave the thermoset undercoating compositions in a largely un-cross-linked state. The coated substrates can then be heated to fully cure the compositions. In certain instances, the disclosed thermoset undercoating compositions can be dried and cured in one step. Additionally, or alternatively, the thermoset undercoating may be dried and then cured at the same time any subsequently applied thermally cured decorative overcoatings are applied.

The thermal curing conditions will vary depending upon the method of application and the intended end use. The curing process may be performed at any suitable temperature, including, for example, oven temperatures in the range of from about 100° C. to about 300° C., and more typically from about 177° C. to about 250° C. If metal coil is the substrate to be coated, curing of the applied thermoset undercoating composition may be conducted, for example, by heating the coated metal substrate over a suitable time to a peak metal temperature ("PMT") of preferably greater than about 350° F. (177° C.). More preferably, the coated metal coil is heated for a suitable time (e.g., about 5 to 900 seconds) to a PMT of at least about 425° F. (218° C.). In some embodiments, the residence time of the coated article within the confines of the curing oven is typically from 1 minute to 5 minutes.

The cured thermoset undercoatings are highly resistant to water, including exposure to water via immersion, humidity, condensation, or the like to prevent corrosion and help preserve the visual aesthetics of the exterior surface. Preferred thermoset undercoating disclosed herein exhibit a superior combination of coating attributes such as good flexibility, good substrate and overcoat adhesion, good chemical resistance and corrosion protection, good fabrication properties, and a smooth and regular coating appearance free of blisters and other application-related defects.

In preferred embodiments, the packaging article includes a multi-coat coating system that includes the thermoset undercoating and one or more decorative or protective overcoats. In such examples, the thermoset undercoating composition is used as an exterior primer layer for different types of decorative overcoatings applied thereto. The decorative overcoatings may provide product information, branding insignia, or other illustrative design dress to the article. Such decorating coatings can include multi-colored illustrations and designs that catch the attention of the consumer and improve the overall visual aesthetics of the packaging article.

The decorative overcoats may be derived from printing ink compositions that are either free-radically curable ink compositions or thermally curable ink compositions. Exemplary embodiments of decorative overcoat compositions generally include a binder component including at least one binder oligomer of polymer, at least one colorant, and optional liquid carrier as understood by those having ordinary skill in the art.

The optional liquid carrier of the decorative overcoat may be aqueous or organic or may include a combination of water and organic constituents. Preferred liquid carriers are organic materials in which water is excluded or limited to 20 wt. % or less, preferably 10 wt. % or less, even more preferably 1 wt. % or less of the liquid carrier based on the total weight of liquid carrier. The exclusion or reduced water content in such decorative overcoat compositions may help reduce the drying or curing time of the layer.

Decorative overcoatings are typically applied to the exterior surface of the packaging article at high speed and are generally applied using one of two techniques. The first technique involves depositing a free-radically curable ink composition on the surface of the article and curing the composition using radiation. Free-radically curable ink compositions generally require individual printing and curing steps with each subsequently applied decorative layer but may generally be applied at higher speeds compared the thermally cured decorative coatings.

Commercially available inks for use as decorative overcoatings may include, but are not limited to, MD KING™ metal decorating inks from Toyo Ink, ZENITH™ OV inks from AkzoNobel, INXCURE™ and other inks available from INX International.

A second technique used for applying decorative overcoatings compositions involves depositing one or more layers of a thermally curable composition on the surface of the disclosed undercoating and article and curing the composition using at an elevated temperature. When applying thermally curable ink compositions, the formulated colors are usually applied in multiple layers on each other as a wet-on-wet layer application without intermediate curing of the individual layers. In a wet-on-wet application, the individual layers are not fully cured until the end stage. The resulting uncured or wet, multilayer structure is then heated at the end of the application process to thermally cure the multilayer system. Some combinations of wet-on-wet and wet-on-dry multiple layers situations are also known to exist.

As discussed above, each type of decorative overcoat (e.g., free-radically or thermally cured) provides certain advantages, but due to the different curing properties and application techniques, the decorative overcoats will have different requirements for the receiving undercoating. In general, the undercoating should preferably exhibit strong bonding forces with the subsequently applied decorative overcoating that resist the strong pulling forces arising when the decorative overcoatings are applied to the exterior surface of the article, especially in high-speed roller coating applications. Moreover, the undercoat coating preferably possesses the ability to form strong adhesion bonds with the metal substrate and with the decorative overcoat once the composition is thermally or radically cured, despite the fact that thermally cured and radically cured compositions have very different chemical interactions and are often incompatible and strongly antagonistic with one another. In some embodiments, the adhesion compatibility of the layers can be examined by applying a decorative overcoat to the undercoat and curing for one second followed by immediately performing a tape adhesion test (e.g., SCOTCH 610 tape). The tape mimics the pull a second decorative coating would apply if it was printed in line right after the first coating in a wet-on-dry situation. The invention provides immediate t=5 adhesion (no failure), which prevents picking of the first cured decorative coating by the subsequent wet applied coatings. The covalent bonds are responsible for this immediate adhesion performance.

Additionally, the undercoating should also exhibit good wetting properties to ensure the proper distribution of the subsequently applied decorative overcoats. The different chemical properties of thermally cured and free-radically cured overcoats make developing universal undercoating compositions compatible with both coating systems challenging, especially regarding simultaneously excellent wetting and adhesion properties of both types of subsequently applied decorative overcoats. For example, conventional thermoset undercoats providing good wetting and adhesion properties with subsequently applied thermally cured decorative overcoating compositions, often have poor wetting or adhesion to the free-radically curable printing ink compositions. The disclosed thermoset undercoating may provide sufficient adhesion (e.g., a tape adhesion score of t=5) with both subsequently applied thermally cured decorative overcoating compositions and free-radically curable printing ink compositions.

As discussed above, the disclosed thermoset undercoating compositions, which include the adhesion promoting additive, act as a universal primer layer that is compatible with both thermally cured and free-radically cured decorative overcoats. The disclosed thermoset undercoating compositions therefore provide packaging article manufactures greater flexibility when choosing the type of decorative overcoating to apply without compromising on crucial aspect or performance criteria.

In both types of multi-coat coating systems, after (optional) application of the one or more decorative overcoats, the coating may also receive an additional clear overcoat or varnish applied on the underlying decorative layers and designed to improve the abrasion resistance or other properties of the article. With the thermally curable decorative overcoats, for example, the varnish may be applied as a wet-on-wet layer, while with the free-radically curable decorative overcoats the varnish may be applied on the cured decorative layers and undercoat and subsequently cured using a suitable technique.

The coating thickness of a particular layer and the overall multi-coat coating system will vary depending upon the coating material used, the substrate, the coating application method, and the end use for the coated article. The resultant cured layer of the disclosed thermoset undercoating composition may have any suitable overall coating thickness, but will typically have an overall average cured coating thickness of from about 2 microns (μm) to about 20 μm and more typically from about 3 μm to about 12 μm. In some embodiments, the average coating thickness of the cured multi-coat coating system (e.g., thermoset undercoating plus additional overcoats) may be about 3 μm to about 60 μm and more preferably from about 3 microns to about 40 μm.

Test Methods

Unless indicated otherwise, the following test methods were utilized in the Examples that follow.

Rating Adhesion by Tape Test

Adhesion tape testing is performed to assess whether a particular overcoating adheres to underlying thermoset undercoating. The adhesion test was performed according to ASTM D 3359—Test Method B, using SCOTCH 610 tape (available from 3M Company of Saint Paul, Minnesota). Adhesion is generally rated on a scale of 0-5 where a rating of "5" indicates no adhesion failure, a rating of "4" indicates 95% of the coating remains adhered, a rating of "3" indicates 85-95% of the coating remains adhered, and so on. Adhesion ratings of 5 are typically desired for commercially viable coatings.

Adhesion Under Deformation Test

Adhesion test is performed on fabricated metal parts. Fabrication is performed by converting a suitably coated flat panel into an asymmetric square box and assessing changes in the most bent or stretched areas of the box. The asymmetric box possesses four corners with increasingly sharp radii, offering a wide range of deformations in only one test sample.

The coating system used in theses tests comprises four layers: a) the tested basecoat, b) and c) two full coverage layers of printing ink and d) a protective varnish. Layers b), c) and d) are preferably applied in coatweights equal or greater than what may be considered industrially necessary. Defects related to adhesion failures, either between interlayers or of the entire multilayer coating structure may range from total loss of adhesion to partial loss in one or more corners, partial loss of adhesion on the bends, to "frosting" (a visual whitening of the multilayer structure) to adhesion loss after application of SCOTCH 610 tape to the deformed areas, to no detectable impact. Tape may be applied to any of the relevant areas of the box to further trigger adhesion losses.

A ranking system is used for rating performance, on a scale of 0 (total loss of adhesion on every corner of the can) to 5 when no visible impact is noted. In the above severe testing conditions, a fully satisfactory coating system (basecoat+inks+protective varnish) would get a rating of at least 4.5.

Wedge Bend

Wedge bend test is performed according to ASTM 3281 by impact-bending an 11 cm strip of coated metal, usually 0.22 mm gauge tinplate, forming a continuously increasing angle, from 180° at one end of the strip to about 165° at the other end, forming and increasingly rounded bent edge. The distance from the shallow-bended end to the first visible cracks in the coating is reported in mm as the wedge bend value. For instance, a wedge bend of 84 means that the first cracks in the coating appear 84 mm from the open end of the 110 mm strip.

Solvent Rub Resistance

The extent of "cure" or crosslinking of a coating is measured as a resistance to solvents, such as methyl ethyl ketone (MEK) (available from Exxon, Newark, NJ). This test is performed as described in ASTM D 5402 93. The number of double-rubs (e.g., one back-and forth motion) required to induce coating damage through to its substrate layer is reported. This test is often referred to as "MEK Resistance."

Appearance Test

The visual aspect of decorative layers is estimated in wet-on-wet and wet-on-dry situations by ranking visual defects on a scale of 0 to 5, 0 indicating complete loss of visual appeal (e.g., complete dewetting, strong color change, large dot gain, or color transfers) and 5 indicating no detectable visual loss.

In wet-on-wet application, at least one ink is applied wet onto the baked undercoat to evaluate, then at least one varnish is applied wet onto the wet ink to form a wet coating system. This sequential application is conducted either with draw-down bars, or with a roller coater. Visual ratings are estimated immediately, after 10 minutes free standing time at room temperature, and after baking or radiation-curing of the wet coating system. The worst of any collected ratings at every step is selected to represent coating performance. A rating of 4.5 is typically desired for industrial applications.

EXAMPLES

The following examples are offered to aid in understanding of the present invention and are not to be construed as limiting the scope thereof. Unless otherwise indicated, all parts and percentages are by weight.

Example 1: Thermoset Undercoating Compositions and Testing

Three base undercoating compositions (B1-B3) were prepared that excluded the presence of an adhesion promoting additive. The base undercoatings included predominately a mixture of polyester resin and pigment combined with a crosslinker and catalyst in a solvent.

Six sample thermoset undercoating compositions were prepared from the base compositions. For each sample, 100 parts of base undercoating compositions B1-B3 were combined with a melamine-acrylate resin (SARTOMER CN 890 supplied by Sartomer Europe) as the adhesion promoting additive. The six thermoset undercoating compositions are shown in Table 1 below:

TABLE 1

Thermoset undercoating compositions

| Ingredient | Details | Sample relative amount (by weight) | | | | | |
| --- | --- | --- | --- | --- | --- | --- | --- |
| | | S1 | S2 | S3 | S4 | S5 | S6 |
| Base composition (Table 1) | B1 | 100 | 100 | — | — | — | — |
| | B2 | — | — | 100 | 100 | — | — |
| | B3 | — | — | — | — | 100 | 100 |
| Melamine Acrylate | SARTOMER CN 890 | 0.5 | — | — | — | — | — |
| | | — | 5.0 | — | — | — | — |
| | | — | — | 0.5 | — | — | — |
| | | — | — | — | 5.0 | — | — |
| | | — | — | — | — | 0.5 | — |
| | | — | — | — | — | — | 5.0 |

Wet-on-wet appearance testing. Each thermoset undercoating composition from Table 1 underwent a wet-on-wet appearance test with three different subsequently applied decorative overcoats. Each sample was prepared by applying and drying the undercoating composition on a tinplate substrate. The undercoatings were dried at 200° C. for 12 minutes. Next, one coat of thermally curable decorative ink and one coat of either one of three selected commercially available protective coatings for can closures (28S50AC), 3PC food cans (V61S28AA), and 2PC food cans (ME 812 KD) respectively were applied onto the wet ink and the system was rated for appearance according to the method described above. The results of each appearance test are shown in Table 2.

TABLE 2

Wet-on-wet appearance tests

| Secondary layer | B1 | S1 | S2 | B2 | S3 | S4 | B3 | S5 | S6 |
|---|---|---|---|---|---|---|---|---|---|
| 28S50AC | 4.5 | 5 | 4.75 | 5 | 5 | 5 | 4.5 | 5 | 5 |
| V61S28AA | 1.5 | 4 | 3.75 | 4 | 5 | 5 | 2.5 | 5 | 5 |
| ME 812 KD | 4 | 4.5 | 4.5 | 5 | 5 | 5 | 5 | 5 | 5 |

The wet-on-wet tests demonstrated the adhesion promoting additive (melamine acrylate) either performed comparably or substantially improved the appearance of the subsequently applied thermoset overcoat.

UV adhesion testing. Each thermoset undercoating composition from Table 2 along with the base undercoating composition underwent a UV overcoat adhesion test with subsequently applied decorative overcoats. Each sample was prepared by applying and drying the undercoating composition on a tinplate substrate. The undercoatings were dried and cured at 200° C. for 12 minutes. Next, one UV curable decorative overcoating was applied to the dried undercoating in two consecutive coats, selected from TU-9550 Black supplied by Sun Chemical (UV45) and 1297325 UV cure black supplied by INX International (UV2), and cured according to their respective specifications under medium pressure mercury lamps. The adhesion test was carried out according to ASTM D 3359—Test Method B as described above. The results of each adhesion test are shown in Table 3.

TABLE 3

UV adhesion tests

| Secondary layer | B1 | S1 | S2 | B2 | S3 | S4 | B3 | S5 | S6 |
|---|---|---|---|---|---|---|---|---|---|
| UV2 | 5 | 5 | 5 | 5 | 5 | 5 | 5 | 5 | 5 |
| UV45 | 5 | 5 | 5 | 4.75 | 4.75 | 5 | 2 | 3 | 5 |

The UV adhesion tests demonstrated the adhesion promoting additive (melamine acrylate) improved the adhesion performance between the thermoset undercoating and the subsequently applied free-radically cured decorative overcoat, or maintained adhesion on coating systems where appearance was greatly improved (e.g., Si and S2). Each thermoset undercoating composition that include the described adhesion promoting additive within the claimed ranges demonstrated sufficient adhesion to the subsequently applied and cured radiationally cured decorative overcoating layer.

Wedge bend and crosslinking tests. Additional substrate bending and methyl ethyl ketone (MEK) rub resistance tests (e.g., Solvent Rub Resistant test) were performed on each thermoset undercoating composition to determine if the adhesion promoting additive behaves as a crosslinker within the underlying base composition. Each undercoating was applied to a tinplate substrate. The applied undercoatings were independently subjected to UV lamp exposure, thermal curing conditions or thermal curing conditions followed by UV lamp exposure. For the UV lamp exposure only experiment, all thermoset undercoatings remained liquid indicating the amount of adhesion promoting agent is insufficient to cure the thermoset undercoating under UV curing conditions. For the thermally cured samples, a wedge bend and MEK rub resistance test were performed. The wedge bend test measures the resistance of the resultant thermoset undercoating to cracking under substrate bending. The MEK rub resistance tests provided an indication of the crosslinking density of the undercoating after being thermally cured with or without exposure to three passes under a UV lamp. Additional crosslinking that occurred during the UV exposure would result in a significant increase in the coating MEK rub resistance and decrease in the coatings wedge bend value. The wedge bend test and MEK rub resistance tests were performed. The results of the substrate bending and MEK rub resistance tests are shown in Table 4.

TABLE 4

Wedge bend and MEK rub tests

| Test | Cure Conditions | B1 | S1 | S2 | B2 | S3 | S4 | B3 | S5 | S6 |
|---|---|---|---|---|---|---|---|---|---|---|
| Wedge Bend | Heat | 85.0 | 96.5 | 99 | 92.0 | 90.0 | 81.0 | 100 | 98.0 | 101.5 |
| | Heat plus UV | 89.5 | 95.5 | 95 | 88.5 | 92.0 | 89.5 | 98.5 | 97.5 | 105 |
| MEK Rub | Heat | 20 | 21 | 11 | 31 | 34 | 15 | 45 | 58 | 30 |
| | Heat plus UV | 26 | 23 | 12 | 33 | 28 | 15 | 54 | 54 | 29 |

The wedge bend and MEK rub resistance experiments all showed little change in experimental results after being exposed to UV light. The wedge bend and MEK rub resistance results demonstrated that the melamine acrylate adhesion promoting additive did not have any significant crosslinking effect on the base thermoset undercoating composition, showing that the modified basecoat does not function as a dual-cure coating.

Example 2: Efficacy of Melamine Acrylate with Other Acrylated Additives

A base thermoset undercoating composition was prepared having a predominate mixture of polyester binder and pigment, combined with catalyst, crosslinker, and solvent material absent the disclosed adhesion promoting additive.

Six comparative formulations of thermoset undercoating compositions were prepared using the base formulation of Table 5. Each comparative undercoating included a melamine acryclate (SARTOMER CN 890 available from Sartomer Europe) or a combination of melamine acrylated and an additional acrylated resin (Laromer™ PE 44 F available from BASF Dispersions & Resins Division). The relative amounts of each material added to the six comparative formulations are indicated below in Table 7.

TABLE 5

Sample thermoset undercoating compositions

| Ingredients | | Sample relative amount (by weight) | | | | | |
|---|---|---|---|---|---|---|---|
| | | S7 | S8 | S9 | S10 | S11 | S12 |
| Base composition | | 99.5 | 99 | 98 | 98.05 | 97.55 | 96.55 |
| Melamine Acrylate | SARTOMER CN 890 | 0.50 | 1.00 | 2.00 | 0.50 | 1.00 | 2.00 |
| Acrylate Oligomer | LAROMER PE 44 F | — | — | — | 1.45 | 1.45 | 1.45 |

Wet-on-wet appearance and UV adhesion testings were performed on each of the six comparative formulations. Multiple samples of each of the six comparative formulations were prepared by applying and drying the thermoset undercoating composition on a tinplate metal substrate. The applied thermoset undercoatings compositions were then dried and cured at 200° C. for 12 minutes. Next, UV or thermally curable decorative overcoating were applied to the cured test samples. The thermally curable decorative overcoating included 1301872-1315 MAGENTA 4COL 23005 from INX (thermally curable ink). The UV curable decorative overcoating included and TU-9550 Black from Sun Chemical (UV45). For the thermally curable decorative overcoat, the overcoat was applied and further coated wet with a protective varnish. For the UV curable decorative overcoat, the overcoat was applied and cured according to manufacturing specifications. The results of adhesion and appearance tests are shown in Table 6.

TABLE 6

Adhesion testing

| | | Adhesion/Appearance score | | | | | |
|---|---|---|---|---|---|---|---|
| Test | Conditions | S7 | S8 | S9 | S10 | S11 | S12 |
| UV45 | Immediate | | | 4.5 | | 4.5 | 4.75 |
| | 3 days | 4 | 4 | 4.5 | 4.5 | 4.5 | 4.5 |
| | 10 days | 4.75 | 5 | 4.25 | 5 | 5 | 4.5 |
| | 17 days | 4.75 | 4.75 | 4.75 | 4.75 | 4.75 | |
| | 26 days | 5 | 4.75 | 5 | 5 | 5 | 5 |
| Thermally curable ink | Varnish V61S28AA | 3 | 3.5 | 5 | 2.5 | 3.25 | 5 |
| | Varnish 28S50AA | 4.5 | 4.5 | 5 | 4.5 | 4.5 | 5 |

All six comparative formulations including the melamine acrylate as the adhesion promoting additive exhibited excellent immediate and long term adhesion to the UV curable decorative overcoat. The tests also showed that increasing the relative amount of melamine acrylate present in the comparative formulations from 0.5% to 2% resulted in a simultaneous increase in the adhesion to both UV cured decorative overcoats and to wet-on-wet thermally curable decorative overcoats, demonstrating an otherwise difficult to obtain excellent compatibility between the basecoat and both overcoat chemistries at the same time. Comparing samples S7-S9 to S10-S12 also showed that the inclusion of the non-melamine, acrylated resin had no effect on adhesion or appearance properties when the melamine acrylated is present.

Example 3: Efficacy of Melamine Acrylate Vs. Non-Acrylated Resins

Six additional comparative formulations of thermoset undercoatings were prepared using the base undercoat formulation of Table 5. Each comparative undercoating included a melamine acrylate (SARTOMER CN 890 available from Sartomer Europe), an acrylated resin (Laromer™ PE 44 F available from BASF Dispersions & Resins Division), or a non-acrylated oligomer (WorléeKyd B 868 alkyd resin supplied by Worlée-Chemie GmbH), or a combination thereof. The relative amounts of each material added to the six comparative formulations are shown below in Table 7.

TABLE 7

Sample thermoset undercoating compositions

| Ingredients | | Sample relative amount (by weight) | | | | | |
|---|---|---|---|---|---|---|---|
| | | S13 | S14 | S15 | S16 | S17 | S18 |
| Base composition | | 97.55 | 97.9 | 97.7 | 97.95 | 97.7 | 96.5 |
| Melamine Acrylate | SARTOMER CN 890 | — | — | — | 2 | 2 | 2 |
| Non-acrlyated Oligomer | B868 | 0.1 | 0.1 | 0.3 | 0.05 | 0.3 | 0.05 |
| Acrylate Oligomer | LAROMER ™ PE 44 F | 1.45 | 2 | 2 | — | — | 1.45 |

Wet-on-wet appearance and UV adhesion testing were performed on each of the six comparative formulations. Multiple samples of each of the six comparative formulations were prepared by applying and drying the thermoset undercoating composition on a tinplate metal substrate. The applied thermoset undercoatings compositions were then dried and cured at 200° C. for 12 minutes. Next, UV or thermally curable decorative overcoating were applied to the cured test samples. The thermally curable decorative overcoating included 1301872-1315 MAGENTA 4COL 23005 from INX (thermally curable ink). The UV curable decorative overcoating included and TU-9550 Black from Sun Chemical (UV45). For the thermally curable decorative overcoat, the overcoat was applied and further coated wet with a protective varnish. For the UV curable decorative overcoat, the overcoat was applied and cured according to manufacturing specifications. The results of each adhesion and appearance test are shown in Table 8.

TABLE 8

Adhesion testing

| | | Adhesion/Appearance score | | | | | |
|---|---|---|---|---|---|---|---|
| Test | Conditions | S13 | S14 | S15 | S16 | S17 | S18 |
| UV45 | Immediate | 4 | 4.75 | 3.5 | 4 | 4 | 4.75 |
| | 3 days | 3.5 | 5 | 2 | 4.5 | 4 | 4.5 |
| | 10 days | 4 | 5 | 4.5 | 4.5 | 4.75 | 5 |
| | 17 days | 2.5 | 4.5 | 1 | 4.5 | 4 | 4.75 |
| | 26 days | 5 | 5 | 1 | 5 | 4.75 | 4.75 |
| Thermally curable ink | Varnish V61S28AA | 2 | 1.5 | 2.5 | 5 | 5 | 5 |
| | Varnish 28S50AA | 4 | 4 | 4 | 5 | 5 | 5 |

Comparing samples S13 versus S14 showed that using the alkyd resin together with an increased amount of the acrylated resin may be used to obtain an acceptable level of adhesion performance with UV cured overcoatings but the wet-on-wet adhesion performance of such undercoating depended greatly on the particular type of overcoating being applied. Comparing samples S14 versus S15 showed that increasing the amount of alkyd resin in the formulation may provide minor improvements to the wet-on-wet appearance properties but significantly degraded the UV adhesion properties of the coating. Samples S16-S18 with the melamine acrylated adhesion promoting additive showed excellent adhesion properties with all the tested UV overcoats and excellent appearance properties with the wet-on-wet applied conventional inks and protective varnishes. The inclusion of the melamine acrylate adhesion promoting additive showed improvement in the UV adhesion test compared to samples S13-S15 and showed that wet-on-wet appearance is no longer coating-dependent, regardless of the amount of alkyd oligomer used.

What is claimed is:

1. A thermoset undercoating composition for a food or beverage container, the thermoset undercoating composition comprising:
   a binder polymer;
   an adhesion promoting additive comprising an aminoplast resin having at least one reactive group having an ethylenically unsaturated double bond that is reactive under free-radical curing conditions;
   a crosslinker configured to react with the binder polymer upon thermal curing of the thermoset undercoating composition, wherein the crosslinker does not include groups that are reactive under free-radical curing conditions; and
   a liquid carrier.

2. The thermoset undercoating composition of claim 1, wherein the binder polymer comprises a polyether, a polyester, a polyolefin, an acrylic, a polyurethane, a polyamide, or a copolymer or mixture thereof, and wherein the binder polymer has a hydroxyl value of about 10 to about 150.

3. The thermoset undercoating composition of claim 2, wherein the aminoplast resin is substantially non-reactive with the other ingredients of the thermoset undercoating composition during thermal curing.

4. The thermoset undercoating composition of claim 1, wherein the aminoplast resin is derived from ingredients including an aldehyde (typically formaldehyde) and one or more of melamine, benzoguanamine, or urea.

5. The thermoset undercoating composition of claim 1, wherein the ethylenically unsaturated double bond comprises a vinylic double bond.

6. The thermoset undercoating composition of claim 2, wherein the aminoplast resin comprises a (meth)acrylated aminoplast resin optionally selected from one or more of a (meth)acrylated melamine resin, a (meth)acrylated benzoguanamine resin, or (meth)acrylated urea resin.

7. The thermoset undercoating composition of claim 1, wherein the aminoplast resin comprises a (meth)acrylated melamine-formaldehyde resin.

8. The thermoset undercoating composition of claim 1, wherein the aminoplast resin comprises at least one chemical group capable of undergoing self-crosslinking or crosslinking with the binder polymer or the crosslinker during thermal curing.

9. The thermoset undercoating composition of claim 2, wherein the crosslinker is present and comprises at least one phenoplast resin, aminoplast resin that is chemically different from the adhesion promoting additive aminoplast resin, or blocked isocyanate resin.

10. The thermoset undercoating composition of claim 1, wherein the thermoset undercoating composition, prior to curing, comprises a liquid carrier, and wherein the thermoset undercoating composition further comprises a pigment.

11. The thermoset undercoating composition of claim 5, wherein the thermoset undercoating composition forms a white undercoating.

12. The thermoset undercoating composition of claim 11, wherein the thermoset undercoating composition further comprises titanium oxide.

13. The thermoset undercoating composition of claim 1, wherein ingredients of the thermoset undercoating composition, other than the adhesion promoting additive, are free of each of free-radical polymerizable double bonds, free-radical initiators, and substituents that would chemically react with the ethylenically unsaturated double bond of the adhesion promoting additive aminoplast resin under thermal curing conditions of up to 200 Celsius for up to 30 minutes.

14. The thermoset undercoating composition of claim 1, wherein the thermoset undercoating composition comprises about 60 wt. % to about 99 wt. % of the binder polymer based on total resin solids in the undercoating composition and about 1 wt. % to about 40 wt. % of the the crosslinker based on total resin solids in the undercoating composition.

15. The thermoset undercoating composition of claim 2, wherein the thermoset undercoating composition comprises about 0.05 wt. % to about 10 wt. % of the adhesion promoting additive aminoplast resin on a dry solids basis in the undercoating composition.

16. The thermoset undercoating composition of claim 6, wherein the thermoset undercoating composition comprises about 0.05 wt. % to about 5 wt. % of the aminoplast resin on a dry solids basis in the undercoating composition.

17. The thermoset undercoating composition of claim 1, wherein the thermoset undercoating composition comprises about 0.5 wt. % to about 1 wt. % of the aminoplast resin on a dry solids basis in the undercoating composition.

18. A method of forming a packaging article, the method comprising the steps of:
   coating at least a portion of a metal substrate for a food or beverage container with a thermoset undercoating composition, the thermoset undercoating composition comprising:
      a binder polymer;
      a crosslinker configured to react with the binder polymer upon thermal curing of the thermoset undercoating composition, wherein the crosslinker does not include groups that are reactive under free-radical curing conditions; and
      an adhesion promoting additive comprising an aminoplast resin having at least one reactive group having an ethylenically unsaturated double bond that is reactive under free-radical curing conditions;
   thermally drying or curing the thermoset undercoating composition to form a cured thermoset undercoating on the metal substrate;
   coating the dried or cured thermoset undercoating with a second coating composition comprising at least one of a free-radically curable composition or a thermally curable composition; and
   curing the second coating composition to form at least one additional coating on the thermoset undercoating.

19. The method of claim 18, wherein:
the metal substrate comprises aluminum or steel that has an average thickness of about 0.14 millimeters (mm) to about 0.50 mm,
the thermoset undercoating is on the metal substrate and the at least one additional coating is directly on the thermoset undercoating;
the at least one additional coating is a decorative overcoat comprising a free-radically curable or free-radically cured ink composition; and
the cured multi-layer coating system has an overall average coating thickness of about 3 µm to about 40 µm.

20. A packaging article for a food or beverage container, the article comprising:
a container, or a portion thereof, comprising:
a metal substrate; and
a multi-layer coating system applied on at least a portion of the metal substrate, the multi-layer coating system comprising:
(i) a dried or cured thermoset undercoating derived from a thermoset undercoating composition, the thermoset undercoating composition comprising:
a binder polymer;
a crosslinker configured to react with the binder polymer upon thermal curing of the thermoset undercoating composition, wherein the crosslinker does not include groups that are reactive under free-radical curing conditions; and
an adhesion promoting additive comprising an aminoplast resin having at least one reactive group having an ethylenically unsaturated double bond that is reactive under free-radical curing conditions; and
(ii) at least one additional coating on the dried or cured thermoset undercoating, the at least one additional coating derived from a second coating composition comprising at least one of a free-radically curable composition or a thermally curable composition.

* * * * *